Nov. 21, 1961   J. S. SENKEWITZ   3,009,245
FOLDING PEELER
Filed May 19, 1960

INVENTOR
JOHN S. SENKEWITZ
BY Beaman & Beaman
ATTORNEY

United States Patent Office 3,009,245
Patented Nov. 21, 1961

---

3,009,245
FOLDING PEELER
John S. Senkewitz, Brooklyn, Mich., assignor to S & S Industrial Products, Inc., Brooklyn, Mich., a corporation of Michigan
Filed May 19, 1960, Ser. No. 30,284
4 Claims. (Cl. 30—155)

The invention pertains to a peeler as is commonly employed in the preparation of foods and particularly relates to a hand held peeler, having a handle portion and a blade portion wherein the blade portion may be folded to an inoperative and storage position within the handle.

A basic purpose of the invention is to provide a food peeler having handle and blade portions wherein the blade is normally encompassed within the handle and upon desiring to employ the peeler, the blade may be opened to an operative position. Such a peeler is very concise dimensionwise when the blade is in the folded position and is especially adapted for use by campers, hunters, and the like wherein a rugged, space-saving utensil is desired which may be safely carried and wherein the blade cutting edge is protected.

Another object of the invention is to provide a folding food peeler wherein a blade is pivotally secured to a handle and locking means are provided for securely locking the blade portion with respect to the handle to prevent the same from accidentally closing.

Another object of the invention is to provide a folding food peeler which is economical to manufacture yet is of rugged and strong construction and is capable of withstanding extensive abuse.

A further object of the invention is to provide a folding food peeler wherein means are provided for positively locking the blade with respect to the handle and the operation of such means is very easily and simply achieved.

Figure 1:
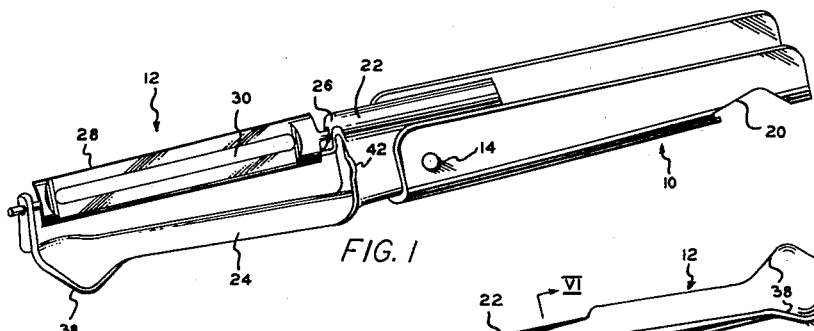
Figure 2:
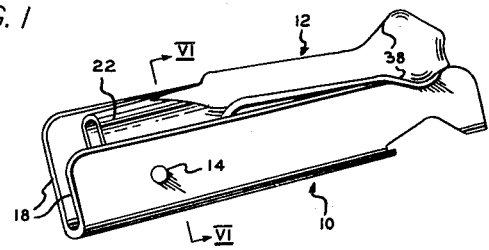
Figure 3:
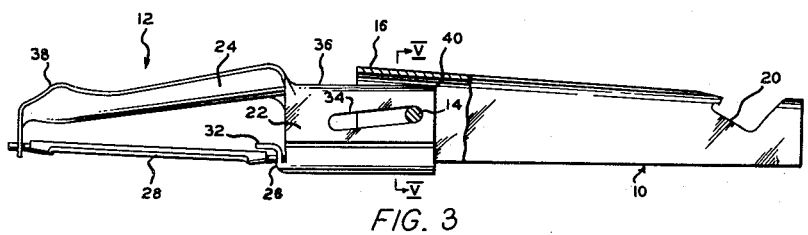
Figure 4:
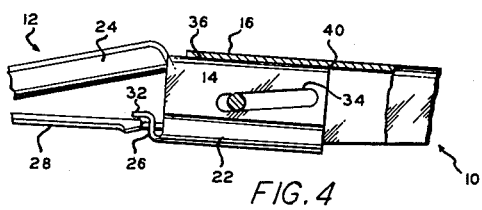
Figure 5:
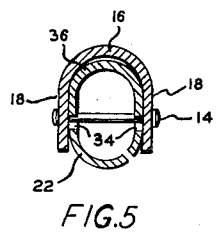
Figure 6:
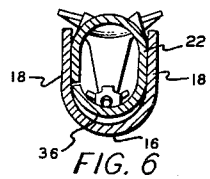

These and other objects of the invention arising from the specific relationships and details of the components of an embodiment will be apparent from the following description and accompanying drawings wherein:

FIG. 1 is a perspective view of the underside of the peeler of the invention with the blade in the open or operative position, FIG. 2 is a perspective view of the underside of the peeler in accord with the invention with the blade in the folded or inoperative position, FIG. 3 is an elevational view, partly in section, of the peeler of the invention wherein the blade portion is in the open and unlocked relation to the handle, FIG. 4 is an elevational detailed view, partially in section, showing the blade and handle portions in the locked relationship, FIG. 5 is an elevational sectional view, taken along section V—V of FIG. 3, and, FIG. 6 is an elevational sectional view of the peeler of the invention, taken along section VI—VI of FIG. 2.

Referring to FIG. 1, it will be noted that the peeler of the invention consists basically of a handle portion 10 and a blade portion 12. The blade portion 12 is permanently affixed to the handle portion 10 by a pivot pin 14 mounted in the handle. The handle portion consists of an elongated U-shaped member having an arcuate base portion 16 and a pair of substantially parallel side portions 18. The handle may be formed of a stamped sheet material, such as steel, and may be provided with a contoured opening 20 adjacent one end, which serves as a bottle or cap opener. A hole is provided in each of the sides 18 of the handle in opposed relation to receive the pivot pin whereby the pivot pin is affixed to the handle upon heading over the pin ends.

The blade portion 12 is best illustrated in FIGS. 1 and 3 and consists of a support portion 22 of oval cross-section, see FIGS. 5 and 6, having a cantilever blade bearing support portion 24 extending therefrom. A second blade support bearing 26 is defined immediately upon the support portion 22. Both the cantilever blade bearing support portion 24 and the blade support 26 are provided with a hole in which to receive a pivot shaft formed on each end of the peeler blade 28. The peeler blade 28 is of an arcuate transverse sectional configuration having a ground double-edged central orifice 30 through which the peelings may pass. This type of blade automatically gauges the depth of cut and as it is rotatably mounted within the blade supports automatically adapts itself to the contour of the food being peeled. The blade support 26 is supplied with a stop portion 32 which limits the rotation of the blade. The blade 28 forms no part of the invention and is described in more detail in U.S. Patent No. 2,232,940 issued February 25, 1941.

The opposite, and substantially planar wall portions, of the blade support portion 22 are each provided with a slot 34 and it will be observed in FIGS. 3 and 4 that the slot 34 is angularly related to the upper surface 36 of the support portion. The pivot pin 14 extends through the slots 34 and, thus, maintains the blade portion connected to the pivot portion. The pivot pin 14 is closely received within the slots 34, however, the pin may be easily shifted relative thereto upon longitudinal movement between the handle and pivot portions of the peeler. Upon locating the pin 14 within the slots 34, as shown in FIG. 3, the blade portion may be pivoted with respect to the handle and pivoted to the closed position of FIG. 2 if desired. The cantilever blade support 24 is provided adjacent its outer end with a pair of ear portions 38 which serve to aid in gripping the blade portion when in the folded position as well as being used as a gouging tool for the preparation of foods such as removing the eyes of potatoes.

Assuming the blade portion to be folded into the handle as shown in FIG. 2, when it is desired to use the peeler, the operator will grasp the handle portion 10 with one hand and the ears 38 of the handle portion with the other hand and pivot the blade to the fully open position as illustrated in FIGS. 1 and 3. At this time the pin will be located in the slots 34 as shown in FIG. 3. To lock the blade portion 12 with respect to the handle it is necessary only to move the blade portion linearly to the right, FIG. 3, with respect to the handle. This action causes the blade support portion 22 to move relative to the pin 14 and the cooperation of the angularly disposed slots with the pin will cause the support portion 22 to move toward the base portion 16 of the handle. This motion is continued until the support portion 22 is intimately "wedged" against the base portion of the handle and, thus, the blade portion is firmly locked with respect to the handle portion. As the surface 36 of the support portion is complementary in configuration to the inner radius of the handle base portion 16 an extensive engagement between the support portion and the handle portion is achieved and, in effect, the blade portion and handle portion become an integral unit. The peeler may now be employed in the conventional fashion wherein the operator will grasp the peeler by the handle portion. When it is desired to fold the blade portion back into the handle, the blade portion is moved to the left, FIG. 3, with respect to the handle to relocate the pin within the slots as shown in this figure and thereafter the blade portion may be pivoted in a counterclockwise direction and the blade portion 12 received within the handle portion 10. When the pin 14 is positioned within slot 34 as shown in FIG. 3, the edge 40 of the blade support portion 22 just clears the handle base portion 16 when pivoting the blade portion relative to the handle portion and upon the pin 14 being displaced a slight amount within slot 34 the edge 40 will interfere with base position 16 if the blade portion attempts to pivot relative to the handle. Thus, should the wedge lock become accidentally disengaged the blade portion is not likely to pivot back into the operator's hand.

To insure that the blade will be maintained within the handle, the width of the blade support portion 22 adjacent the blade is slightly greater than the normal inner dimension between the sides 18 of the handle portion whereby the pivoting of the blade portion to the relationship of FIG. 2 will cause the blade support portion to slightly force the handle side portions 18 apart and this frictional engagement will securely hold the blade in the folded position when the peeler is not in use. A similar action may be provided by forming a projection 42 in the support portion, as shown in FIG. 1 which extends outwardly and will frictionally engage one of the sides of the handle portion with the blade in the folded position.

It will, thus, be appreciated that the invention discloses a foldable peeler utensil which is rugged in construction, easily manufacturable, and the blade may be positively locked with respect to the handle rendering the utensil safe in operation without requiring complicated locking structure. It is not the intention that the invention be limited to the described and illustrated embodiment and the spirit and scope of the invention is to be defined only by the following claims.

I claim:

1. In a food peeler having a handle portion and a blade portion pivotally mounted on said handle portion for movement between operative and inoperative positions, said handle portion comprising an elongated member of U cross-section having a base portion interconnecting a pair of side portions defining a recess within said handle portion adapted to receive said blade portion, a blade mounted on said blade portion, a pivot pin mounted in said handle portion adjacent one end thereof and interposed between said side portions, a slot defined in said blade portion, said pin extending through said slot, said slot being inclined with respect to the longitudinal direction of said handle base portion upon pivoting of said blade portion to the operative position whereby sliding movement of blade portion relative to said handle portion will wedge said blade portion into engagement with said base portion.

2. In a food peeler having a handle portion and a blade portion pivotally mounted on said handle portion, said handle portion comprising an elongated member of U cross-section having a base portion interconnecting a pair of side portions defining a recess receiving said blade portion, a blade mounted on said blade portion, a pivot pin mounted in said handle portion adjacent one end thereof and bridging said side portions, a longitudinally extending slot defined in said blade portion angularly inclined with respect to the base portion of said handle upon said blade portion being disposed substantially parallel to said handle portion, said pin extending through said slot whereby movement of said blade portion relative to said handle portion selectively positions said slot relative to said pin selectively wedgingly engaging said handle and blade base portions and means formed on said blade portion interfering with said handle base portion at one position of said pin within said slot preventing pivoting of said blade portion relative to said handle portion, said interfering means clearing said base portion at another location of said pin within said slot permitting said blade portion to be pivoted relative to said handle portion and substantially wholly received within the recess thereof.

3. In a food peeler as in claim 2 wherein means are carried by said blade portion frictionally engaging said side portions when said blade portion is substantially wholly received within said handle portion recess.

4. In a food peeler having a handle portion and a blade portion, said handle portion comprising an elongated member of U cross-section having a base portion interconnecting a pair of substantially parallel side portions defining a recess in said handle portion, a support portion formed on said blade portion, said support portion being received within one end of said handle portion between the sides thereof and having a configuration similar to said base and side portions, a blade having a pair of cutting edges pivotally mounted on said blade portion and movable between operative and inoperative positions, a pivot pin mounted in said handle portion adjacent one end thereof interposed between said side portions, a slot defined in said support portion, said pin extending through said slot whereby said handle portion pivotally supports said blade portion, said slot being angularly disposed to the longitudinal direction of said handle base portion upon said blade portion being pivoted to the operative position, whereby, axial movement of said blade portion relative to said handle portion in one direction wedges said support portion against said base portion and movement in the other direction removes said support portion from said base portion, said support portion having walls interposed adjacent the side portions of said handle portion, said walls having a portion wherein the distance separating said walls is greater than the normal distance separating said side portions whereby pivoting of said blade portion within said recess frictionally engages said support portion with the handle portion.

References Cited in the file of this patent
UNITED STATES PATENTS

| | | |
|---|---|---|
| 588,174 | Praunegger | Aug. 17, 1897 |
| 2,777,195 | Dalianis | Jan. 15, 1957 |